United States Patent
Chang et al.

(10) Patent No.: US 10,819,130 B2
(45) Date of Patent: Oct. 27, 2020

(54) MOBILE CHARGE/DISCHARGE DEVICE

(71) Applicant: Wistron Corp., Hsichih, New Taipei (TW)

(72) Inventors: Ronald Chang, Milpitas, CA (US); Charles Chang, Zhubei (TW); Heng-Chang Su, Zhubei (TW)

(73) Assignee: WISTRON CORP., New Taipei (TW)

( * ) Notice: Subject to any disclaimer, the term of this patent is extended or adjusted under 35 U.S.C. 154(b) by 399 days.

(21) Appl. No.: 15/575,280

(22) PCT Filed: Oct. 26, 2015

(86) PCT No.: PCT/US2015/057332
§ 371 (c)(1),
(2) Date: Nov. 17, 2017

(87) PCT Pub. No.: WO2016/209302
PCT Pub. Date: Dec. 29, 2016

(65) Prior Publication Data
US 2018/0159348 A1    Jun. 7, 2018

(30) Foreign Application Priority Data

Jun. 25, 2015 (TW) .............................. 104120615 A (51) Int. Cl.
*H02J 7/00* (2006.01)
*H02J 7/34* (2006.01)
(Continued)

(52) U.S. Cl.
CPC ............ *H02J 7/0068* (2013.01); *H02J 7/042* (2013.01); *H02J 7/06* (2013.01); *H02J 7/34* (2013.01); *H02J 7/008* (2013.01)

(58) Field of Classification Search
CPC .. H02J 7/0068; H02J 7/042; H02J 7/06; H02J 7/34
(Continued)

(56) References Cited

U.S. PATENT DOCUMENTS

| 8,965,720 B2 | 2/2015 | Azancot et al. |
| 2013/0169228 A1 | 7/2013 | Yang |

(Continued)

FOREIGN PATENT DOCUMENTS

| CN | 103825329 A | * | 5/2014 |
| TW | M419330 B | | 12/2011 |

(Continued)

OTHER PUBLICATIONS

International Search Report dated Jan. 5, 2016, issued in application No. PCT/US2015/057332.

*Primary Examiner* — Zixuan Zhou
(74) *Attorney, Agent, or Firm* — McClure, Qualey & Rodack, LLP (57) ABSTRACT

A mobile charge/discharge device for being electrically connected to a power source and a first power receiving device is disclosed. The mobile charge/discharge device includes a detection circuit detecting a first working power of the power source and a second working power of the first power receiving device; an input port having a first power supply pin for being electrically connected to the power source; a first output port having a second power supply pin for being electrically connected to the first power receiving device; and a controlling circuit controlling the power source to supply the first power receiving device with a power according to one of the first working power and the second working power and supply the mobile charge/dis- (Continued)

charge device with a power according to the difference of the first working power and the second working power at the same time.

8 Claims, 7 Drawing Sheets

(51) Int. Cl.
*H02J 7/04* (2006.01)
*H02J 7/06* (2006.01)

(58) Field of Classification Search
USPC .......................................... 320/103, 134, 136
See application file for complete search history.

(56) References Cited

U.S. PATENT DOCUMENTS

2014/0203654 A1* 7/2014 Takahashi ......... H01M 10/4207
    307/82
2015/0180356 A1* 6/2015 Norisada ................ B60L 53/22
    363/17

FOREIGN PATENT DOCUMENTS

| TW | I362806 B | 4/2012 |
| TW | 201407927 A | 2/2014 |
| TW | 201440379 A | 10/2014 |
| TW | I455444 B | 10/2014 |

\* cited by examiner

MOBILE CHARGE/DISCHARGE DEVICE

CROSS REFERENCE TO RELATED APPLICATION

The present invention claims the benefits of Taiwan Patent Application No. 104120615, filed on Jun. 25, 2015, at the Taiwan Intellectual Property Office, the disclosures of which are incorporated herein in their entirety by reference.

FIELD OF THE INVENTION

The present invention relates to a mobile charge/discharge device. In particular, it is a mobile charge/discharge device which can charge and discharge at the same time.

BACKGROUND OF THE INVENTION

Because the processes and design of integrated circuits (IC) are progressing more and more, the size of the chips has decreases substantially as the size of mobile devices became smaller, the functions of mobile devices are increasing, and the power consumption increases day by day. However, because of size requirements, the capacity of a battery configured in a mobile device is restricted. Therefore, a mobile charging device (such as a portable power pack) is necessary for keeping devices charged and in operation anywhere.

Figure 1:
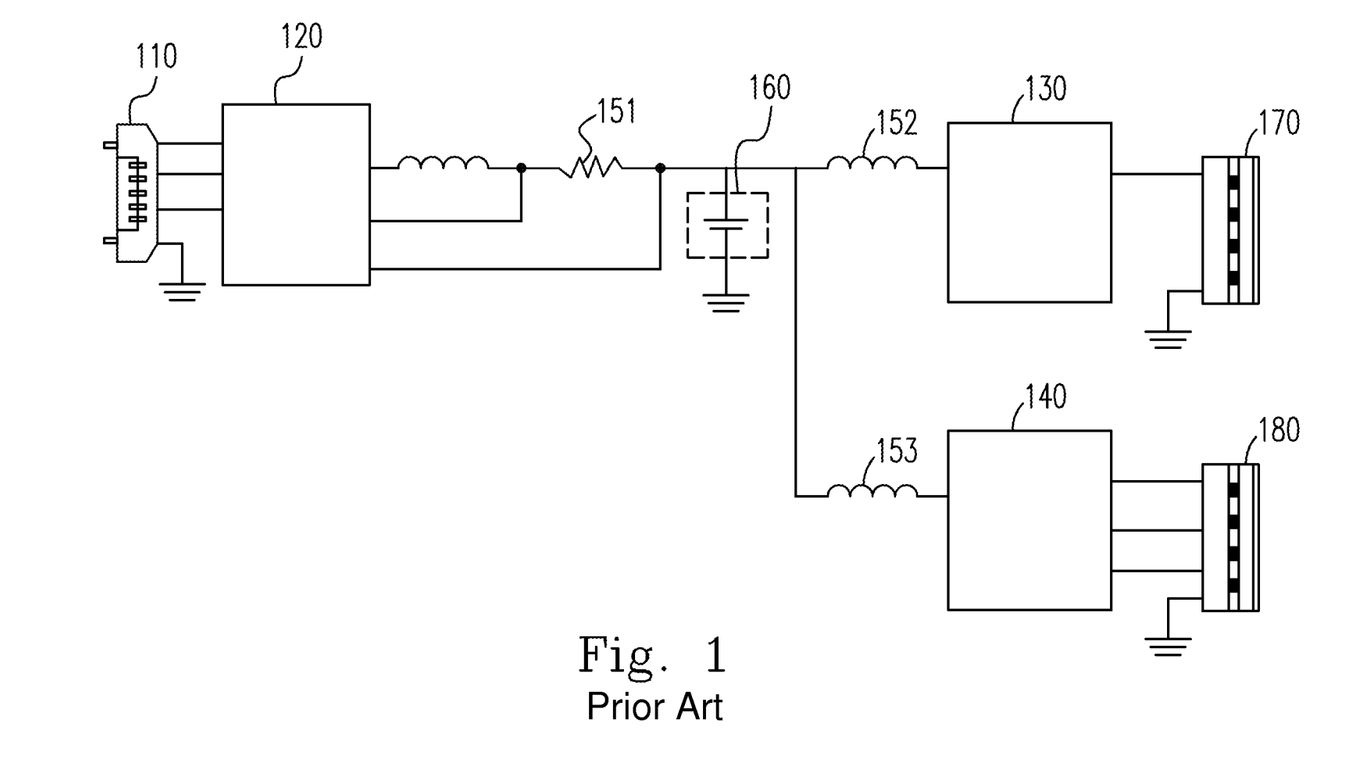
FIG. 1 is a schematic diagram of a portable power pack in the prior art.

Please refer to FIG. 1, which shows an internal circuit diagram of a portable power pack. Because an input port 110 is a USB-interface plug of 5 volts (V) and an accumulator cell 160 is a lithium battery of 4.2 V, a step-down integrated circuit (IC) 120 is required. Likewise, a step-up IC is required when the lithium battery transmits electrical energy to the output port. If two output ports (170, 180) are configured at the output end, two step-up ICs (130, 140) are required. Therefore, it is necessary to have passive elements, such as three ICs and a plurality of resistance inductors (151, 152, 153), to keep the portable power pack in operation in the prior art, wherein many areas of the circuit layout will be occupied by these passive elements because of their large volume, which in turn causes difficulties in the circuit design.

Furthermore, when both the portable power pack and the mobile device need to be charged, the input end of the portable power pack is connected to the adaptor, the output end of the portable power pack is connected to the mobile device, a rechargeable battery is powered by commercial power via the adaptor and the charge circuit, and then the rechargeable battery charges the mobile device via the discharge circuit. Because the size and the number of the passive elements are large, the flowing electricity will produce a lot of heat and thereby the internal temperature of the portable power pack can be as high as 100° C. A High-temperature environment within the rechargeable battery will shorten its life span and endanger the user's safety.

In order to overcome the drawbacks in the prior art, a mobile charge/discharge device is disclosed. The particular design in the present invention not only solves the problems described above, but is also easy to implement. Thus, the present invention has utility for the industry.

SUMMARY OF THE INVENTION

The invention proposes a mobile charge/discharge device which detects the required voltages of the adaptor and the mobile device and then supplies the mobile device and the internal battery of the mobile charge/discharge device with an optimal voltage to achieve the best battery management.

In accordance with an aspect of the present invention, a mobile charge/discharge device is disclosed. The mobile charge/discharge device, for being electrically connected to a power source and a first power receiving device, includes: a detection circuit detecting a first working power of the power source and a second working power of the first power receiving device; an input port having a first power supply pin for being electrically connected to the power source; a first output port having a second power supply pin for being electrically connected to the first power receiving device; and a controlling circuit controlling the power source to supply the first power receiving device with a power according to one of the first working power and the second working power and supply the mobile charge/discharge device with a power according to the difference of the first working power and the second working power at the same time.

In accordance with another aspect of the present invention, a power transmitting device is disclosed. The power transmitting device includes: a power storage for storing a power from an adaptor supplied by a power source; a detection circuit detecting a highest working voltage supplied through the adaptor; and a controlling circuit controlling the power to be stored in the power storage with a voltage according to the highest working voltage in the power storage.

In accordance with the other aspect of the present invention, a mobile charge/discharge device is disclosed. The mobile charge/discharge device, for being electrically connected to a power source and a power receiving device, includes: a detection circuit detecting a first working power of the power source and a second working power of the power receiving device; and a controlling circuit controlling the power source to supply the power receiving device with a power according to the second working power and the mobile charge-discharge device with a power according to the difference of the first working power and the second working power.

DETAILED DESCRIPTION OF THE PREFERRED EMBODIMENTS

The present invention will now be described more specifically with reference to the following embodiments. It is to be noted that the following descriptions of preferred embodiments of this invention are presented herein for the purposes of illustration and description only; it is not intended to be exhaustive or to be limited to the precise form disclosed.

Figure 2:
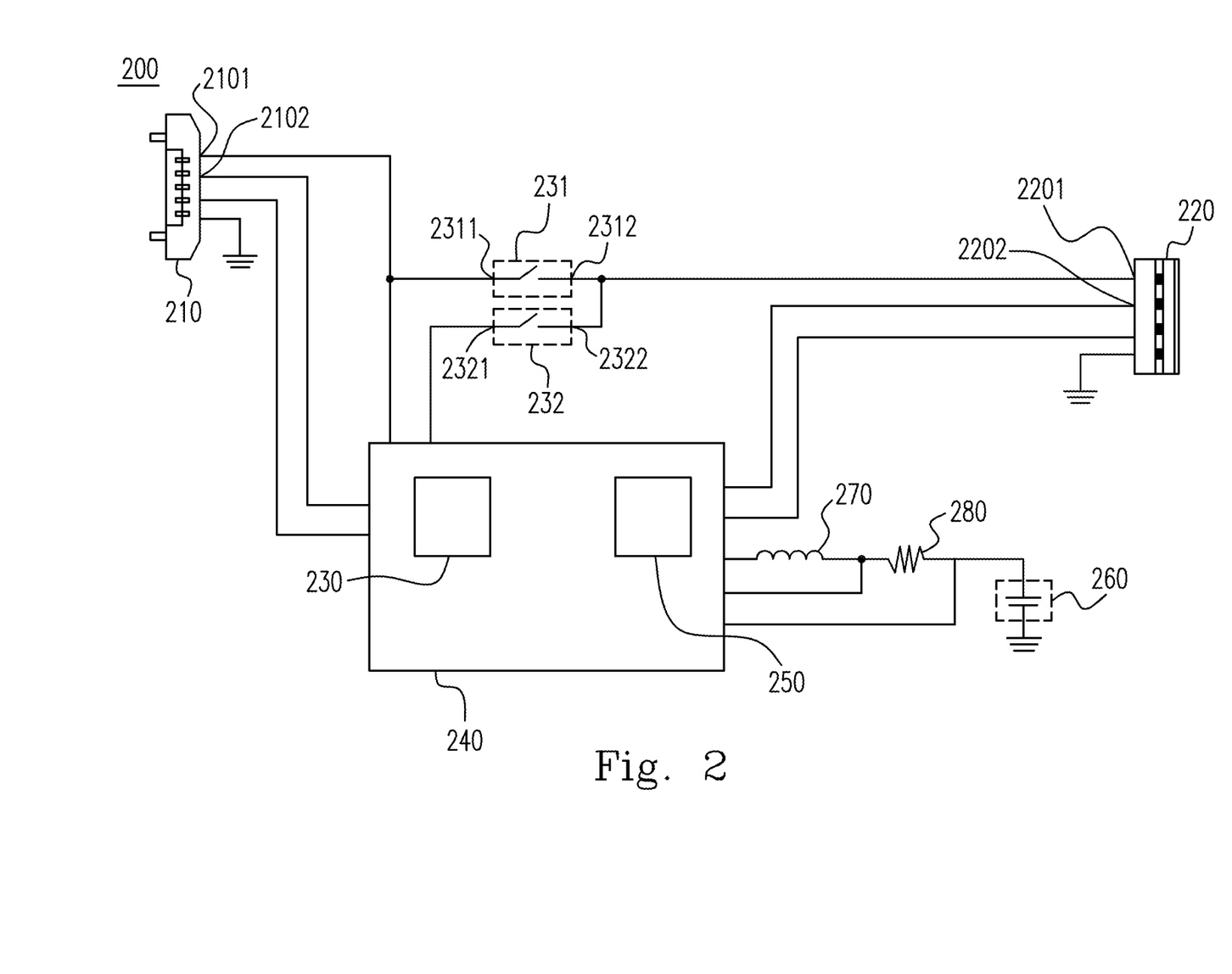
FIG. 2 is a schematic diagram of a mobile charge/discharge device according to a first preferred embodiment of the present invention.

Please refer to FIG. 2, which is a schematic diagram of a mobile charge/discharge device 200 according to a first preferred embodiment of the present invention, and the device 200 includes an input port 210, an output port 220, a controlling circuit 230, a first switch 231, a second switch 232, a charge/discharge module 240, a detection circuit 250 and a power storage 260.

The input port 210 and the output port 220 preferably are Universal Serial Bus (USB) interfaces and are one selected from a group consisting of Type A, Type B, Type C, Mini-A, Mini-B, Micro-A, Micro-B, USB 3.0 Type A, USB 3.0 Type B and USB 3.0 Micro B, individually. The input port 210 is electrically connected to an adaptor (not shown) and has a first power supply pin 2101 which receives power from an adaptor connected to a commercial power source. The output port 220 is electrically connected to a power receiving device (not shown). The power receiving device preferably is a mobile device (or a portable device) which can be one selected from a group consisting of a mobile phone, a tablet device, a music player, a portable power pack and any mobile device applicable to a USB interface, wherein signals with regard to the voltage or the current, which can be supplied by the adaptor, are transmitted to the controlling circuit 230 and the detection circuit 250 via the first power supply pin 2101 or a first data supply pin 2102 of the input port 210, and signals with regard to the voltage or the current, which can be received by the mobile device, are transmitted to the controlling circuit 230 and the detection circuit 250 via the second power supply pin 2201 or a second data supply pin 2202 of the output port 220. The power storage 260 is one selected from a group consisting of a nickel-metal-hydride battery, a nickel-cadmium battery, a lithium battery, a lithium polymer battery and any accumulator battery having a function of repetitive charging/discharging.

The charge/discharge module 240 preferably is an IC (not shown) having a fast charge/discharge efficacy of 5V/9V/12V, includes the controlling circuit 230 and the detection circuit 250. It is worth noted that the phrases "fast charge/discharge", "fast charge" and "fast discharge" disclosed in the invention refer to that the technique in the invention is faster than that in the prior art, and is not limited to a specific protocol. The values "9 V" and "12 V" refer to the preferred embodiments that it is higher than the value "5 V" used in the prior art. The invention is not limited to these two voltages "9 V" and "12 V".

When the input port 210 and the output port 220 are electrically connected to the adaptor (not shown) and the mobile device (not shown), it means that a user would like to charge the mobile device and the internal lithium battery of the mobile charge/discharge device at the same time. The detection circuit 250 detects a maximal power which can be received by the mobile device (hereinafter "a second power") and detects a maximal power which can be supplied by the adaptor (hereinafter "a first power"). It's worth noted that the maximal power disclosed in the invention can be replaced with a maximal voltage and a maximal current equivalent thereto. The difference between the invention and the prior art is that the controlling circuit 240 causes the first power supply pin of the input port to be electrically connected to the second power supply pin of the output port is via a bypass circuit, rather than via the internal lithium battery of the mobile charge/discharge device. The bypass circuit preferably is employed by a first switch. The first switch 231 has a first end 2311 electrically connected to the first power supply pin 2101 and the charge/discharge module 240 and a second end 2312 electrically connected to the second power supply pin 2201. When the first power is larger than the second power, the controlling circuit 230 controls the adaptor and the first switch 231, and causes the adaptor to supply the mobile device with the second power and supply the power storage with the difference between the first power and the second power. When the first power is smaller than the second power, the controlling circuit 230 controls the adaptor and the first switch 231, and causes the adaptor to supply the mobile device with the first power. That is, the controlling circuit 230 preferentially allocates the power supplied by the adaptor to the mobile device, to cause the mobile device to resume operation for the user's utilization. It's not necessary to store the electrical energy to the lithium battery at first and then discharge the lithium battery. The plurality of switches among the charge IC, the lithium battery and the discharge IC are not required. The reduced charge/discharge frequency for the lithium battery and the heat generated when the current passes through the additional active/passive elements can increase the life span and the conversion efficiency of the internal lithium battery of the mobile charge/discharge device. Furthermore, the charge IC and the discharge IC in the prior art are integrated into a fast charge/discharge IC in the invention, and thus only one set of an inductance 270 and a resistance 280 is to be coupled between the charge/discharge module and the lithium battery. The decreased number of passive elements reduces the area of the circuit layout and the size of the mobile charge/discharge device, or increases the capacity of the lithium battery at a specific size.

For example, when a first power of 18 Watt (W) is the highest power that the adaptor can provide and the mobile device can receive a second power of 10 W at most, the controlling circuit 230 controls the first switch 230 to be in the ON-STATE, so that the electrical energy of 10 W is transmitted directly to the mobile device without passing through the internal circuit of the mobile charge/discharge device and the power difference of 8 W between the first power and the second power is stored to the power storage 260. When a first power of 10 W is the highest power that the adaptor can provide, and the mobile device can receive a second power of 18 W at most, the first power is smaller than the second power at this moment, and the controlling circuit 230 transmits the entire electrical energy to the mobile device. The power storage 260 will not store any electrical energy until the mobile device completes the charge. Subsequently, the controlling circuit 230 controls the first switch 231 to be in the OFF-STATE and charges the power storage 260 with the power of 10 W provided by the adaptor.

The first switch, the second switch and the third switch in the invention preferably are employed in a combination of a P-channel MOSFET (PMOS) and an N-Channel MOSFET (NMOS). ON-STATE refers to a switch-on state of a closed switch and OFF-STATE refers to a switch-off state of an open switch.

In addition, the second switch 232 has a third end 2321 electrically connected to the charge/discharge module 240 and a fourth end 2322 electrically connected to the second power supply pin 2201. When the power source of the adaptor is removed, the controlling circuit controls the first switch to be in the OFF-STATE, and the second switch 232 is still in the ON-STATE, so that the mobile device is powered by the power storage 260 of the mobile charge/discharge device 200. Because the fast charge/discharge module has a charge/discharge efficacy of 5 V, 9 V and 12 V, the fast charge/discharge module can charge the mobile device with the highest voltage which can be tolerated, thereby achieving the fast charge effect.

Figure 3:
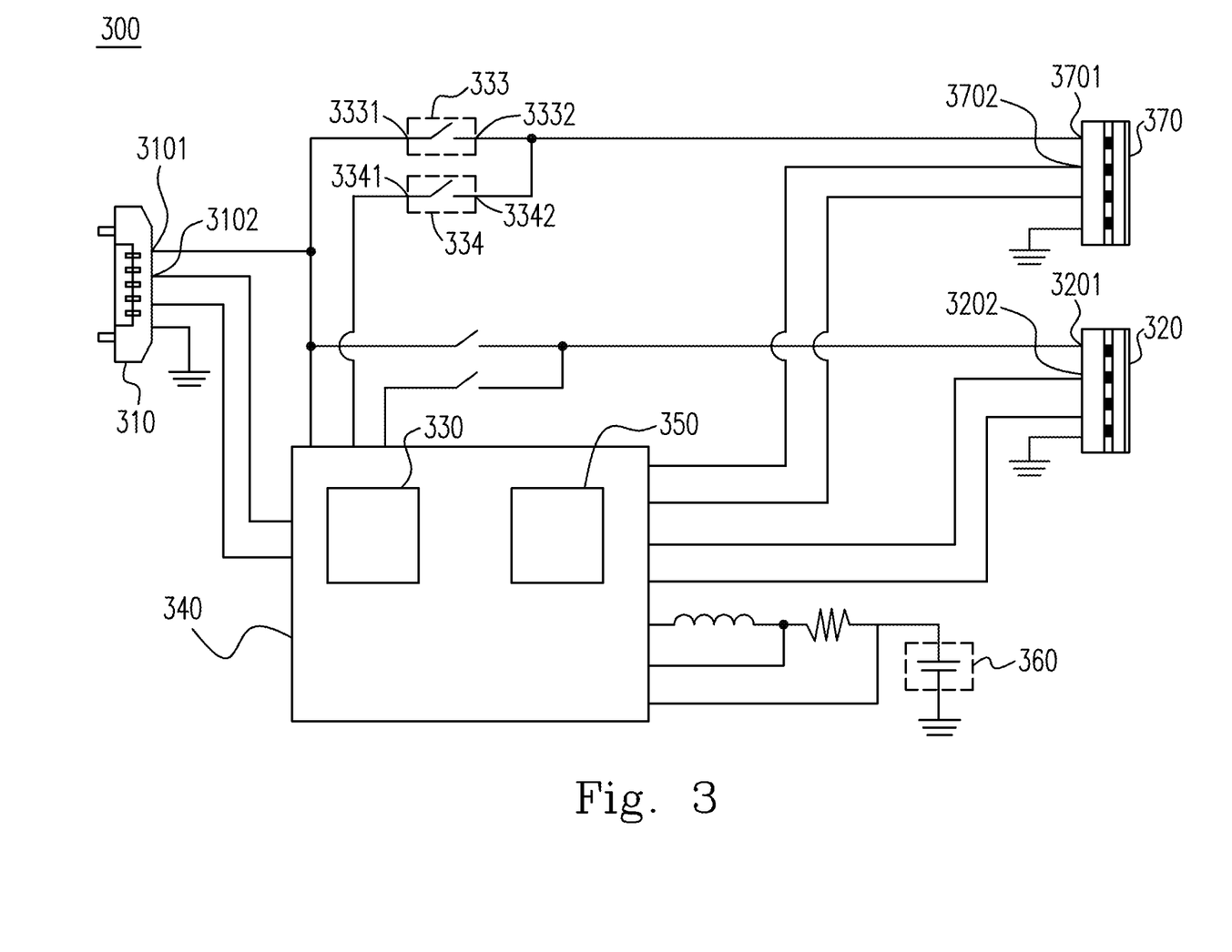
FIG. 3 is a schematic diagram of a mobile charge/discharge device according to a second preferred embodiment of the present invention.

Please refer to FIG. 3, which is a schematic diagram of a mobile charge/discharge device 300 according to a second preferred embodiment of the present invention. The circuit configuration in FIG. 3 is similar to that in FIG. 2. The difference is that the mobile charge/discharge device 300 in FIG. 3 further includes a second output port 370, a third switch 333 and a fourth switch 334, wherein the second output port 370 has a third power supply pin 3701 and a third data supply pin 3702; the third switch 333 has a fifth end 3331 electrically connected to both a first power supply pin 3101 and a charge/discharge module 340, and a sixth end 3332 electrically connected to a third power supply pin 3701; and the fourth switch 334 has a seventh end 3341 electrically connected to the charge/discharge module 340, and an eighth end 3342 electrically connected to the third power supply pin 3701. The second output port 370 is electrically connected to a second mobile device (not shown). Signals with regard to the voltage or the current, which can be received by the second mobile device, are transmitted to the controlling circuit 330 and the detection circuit 350 via the third power supply pin 3701 or the third data supply pin 3702 of the second output port 370.

When the two output ports are electrically connected to the mobile devices, the detection circuit 350 detects the charge voltages required by the connected mobile devices, and the voltage which can be output by the adaptor, wherein the controlling circuit 330 controls the first switch and the third switch to be in the ON-STATE and the second switch and the fourth switch to be in the OFF-STATE, so that the mobile devices are directly powered by the power source of the adaptor. The voltages required and supplied by different mobile devices and adaptors may be different. For instance, on the condition that the adaptor provides the output voltage of 5V/9V, when two output devices are applicable to the fast charge at 9 V, the controlling circuit 330 controls the adaptor to output a voltage of 9 V to fast charge the two devices. When the device connected to the first output port can only receive a voltage of 5 V and the device connected to the second output port can receive a voltage of 9 V at most, the controlling circuit 330 controls the adaptor to output only a voltage of 5 V to protect the device connected to the first output port.

When the power source of the adaptor is removed, the controlling circuit controls the first switch and the third switch to be in the OFF-STATE and the second switch and the fourth switch to be in the ON-STATE, so that the mobile devices are powered by a power storage 360 of the mobile charge/discharge device 300. Because the fast charge/discharge module has a charge/discharge efficacy at 5 V, 9 V and/or 12V, the fast charge/discharge module can output the voltage of 5 V or 9 V to both devices, so that both devices are charged with the optimal voltage to achieve the fast charge effect.

Figure 4:
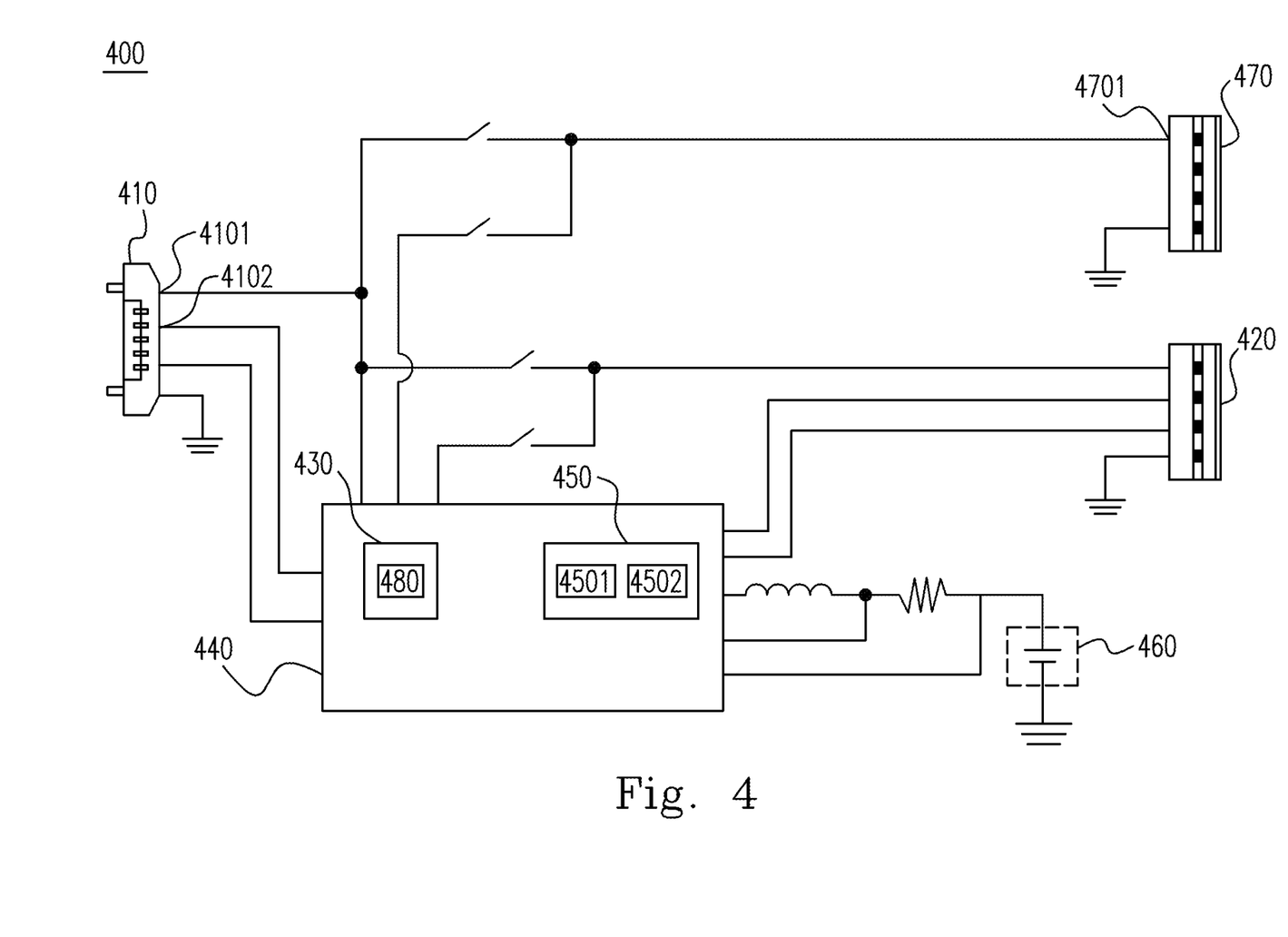
FIG. 4 is a schematic diagram of a mobile charge/discharge device according to a third preferred embodiment of the present invention.

Please refer to FIG. 4, which is a schematic diagram of a mobile charge/discharge device 400 according to a third preferred embodiment of the present invention. The circuit configuration in FIG. 4 is similar to that in FIG. 3. The difference is that the second output 370 in FIG. 3 is replaced with a second output 470 which is a conventional USB interface (i.e. a voltage of 5 V can only be output, and the fast charge is not supported), and the second output 470 is applied in the device so that the fast charge is supported. The detection circuit 450 preferably has a first detection sub-circuit 4501 to detect a first working power of the adaptor and a second detection sub-circuit 4502 to detect a second working power of the device. When the input port 410 is electrically connected to the adaptor (not shown) and both the first output port and the second output port are electrically connected to the mobile device (not shown), the controlling circuit 430 controls the adaptor to only output a voltage of 5 V to the first output port and the second output port to prevent the device from being damaged. When the power source of the adaptor is removed and the second detection sub-circuit 4502 once again detects the condition that both the first output port 420 and the second output port 470 are connected to the mobile devices, the first output port 420 and the second output port 470 remain at an output voltage of 5 V. When the second mobile device electrically connected to the second output port 470 is removed, the second detection sub-circuit 4502 once again detects a highest charge voltage of the first mobile device which is electrically connected to the first output port 420, and the mobile charge/discharge device 400 charges the first mobile device with the highest charge voltage.

Please continuously refer to FIG. 4. When the first output port 420 and the second output port 470 are not connected to any device, it means that the power provided by the adaptor entirely charges the power storage 460, wherein the detection circuit 450 detects the highest working voltage that the adaptor can supply via a first power supply pin 4101 or a first data supply pin 4102, and the controlling circuit controls the mobile charge/discharge device 400 to store power with the highest working voltage. The mobile charge/discharge device of the invention charges the internal lithium battery of the mobile charge/discharge device according to the maximal voltage that the adaptor can provide at the charge stage, and charges the mobile device according to the maximal voltage that the mobile device can tolerate at the discharge stage. Therefore, the purpose of the fast charge to either the internal battery of the mobile charge/discharge device or the external mobile device can be achieved.

The controlling circuit 430 preferably includes a micro control unit (MCU) 480 to receive the signals detected by the detection circuit, and to control the voltage provided by the first to fourth switches and the adaptor and the voltage output by the first and second output port.

Figure 5:
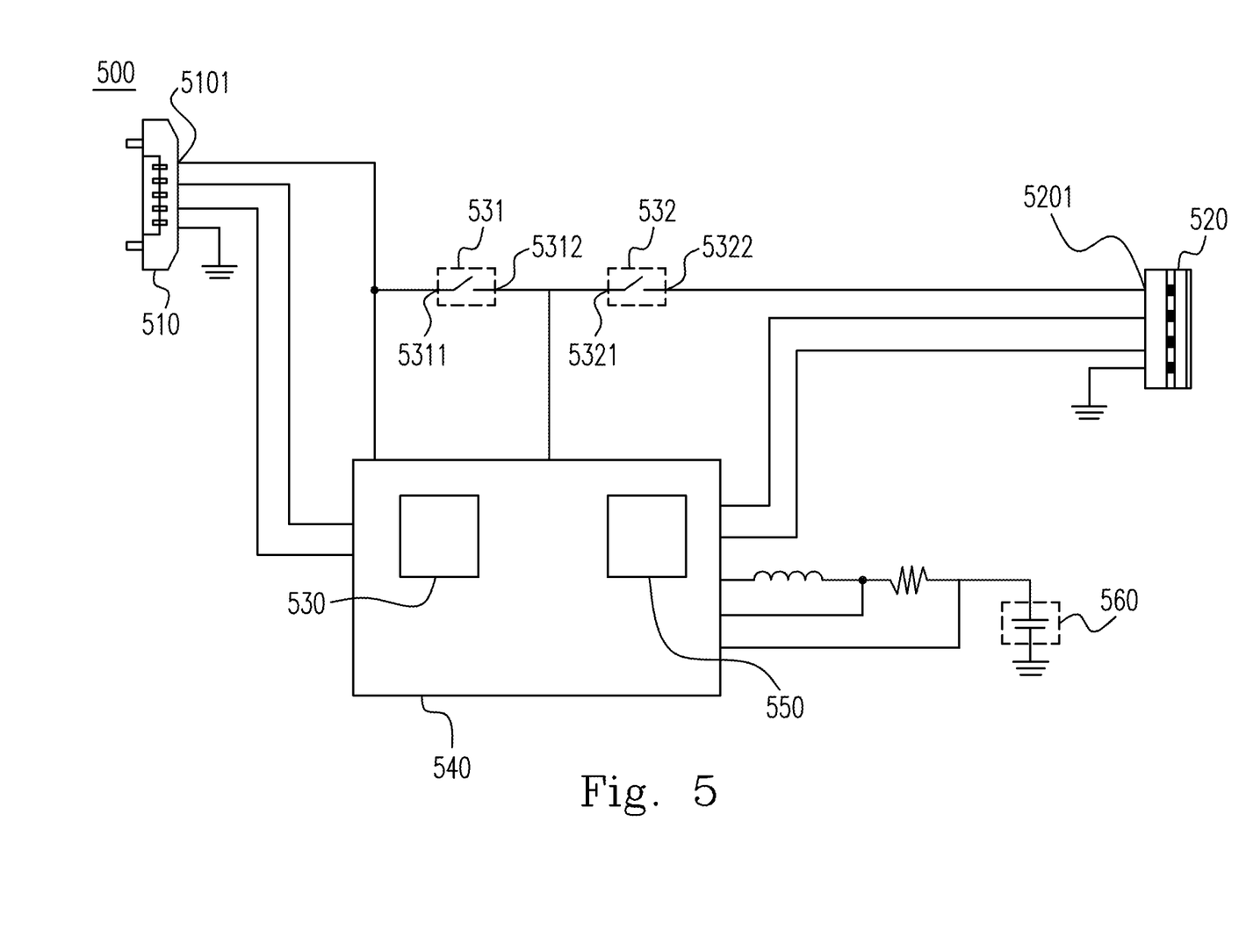
FIG. 5 is a schematic diagram of a mobile charge/discharge device according to a fourth preferred embodiment of the present invention.

Please refer to FIG. 5, which is a schematic diagram of a mobile charge/discharge device 500 according to a fourth preferred embodiment of the present invention. The circuit configuration in FIG. 5 is similar to that in FIG. 2. The difference is that the bypass circuit in FIG. 5 is employed by configuring a first switch 531 in series with a second switch 532. The first switch 531 has a first end 5311 which is electrically connected to both a first power supply pin 5101 of an input port 510 and a charge/discharge module 540, and a second end 5312 which is electrically connected to both the charge/discharge module 540 and a third end 5321 of the second switch 532. The second switch 532 has the third end 5321 which is electrically connected to both the charge/discharge module 540 and the second end 5312 of the first switch, and a fourth end 5322 which is electrically connected to a second power supply end 5201 of an output port 520. When a detection circuit 550 detects that the input port 510 and the output port 520 are electrically connected to the adaptor (not shown) and the mobile device (not shown) respectively, a controlling circuit 530 controls both the first switch 531 and the second switch 532 to be in the ON- STATE to directly charge the mobile device with the power supplied by the adaptor without passing through the internal circuit of the mobile charge/discharge device 500. When the detection circuit 550 detects that the adaptor is removed from the input port 510, the controlling circuit 530 controls the first switch 531 to be in the OFF-STATE and the second switch to be in the ON-STATE, so that the mobile device is powered by a power storage 560 of the mobile charge/discharge device 500. The charge/discharge mechanism for the charge/discharge module 540 is the same as that for the second to fourth preferred embodiments, all of which can provide the fast charge effect.

Figure 6:
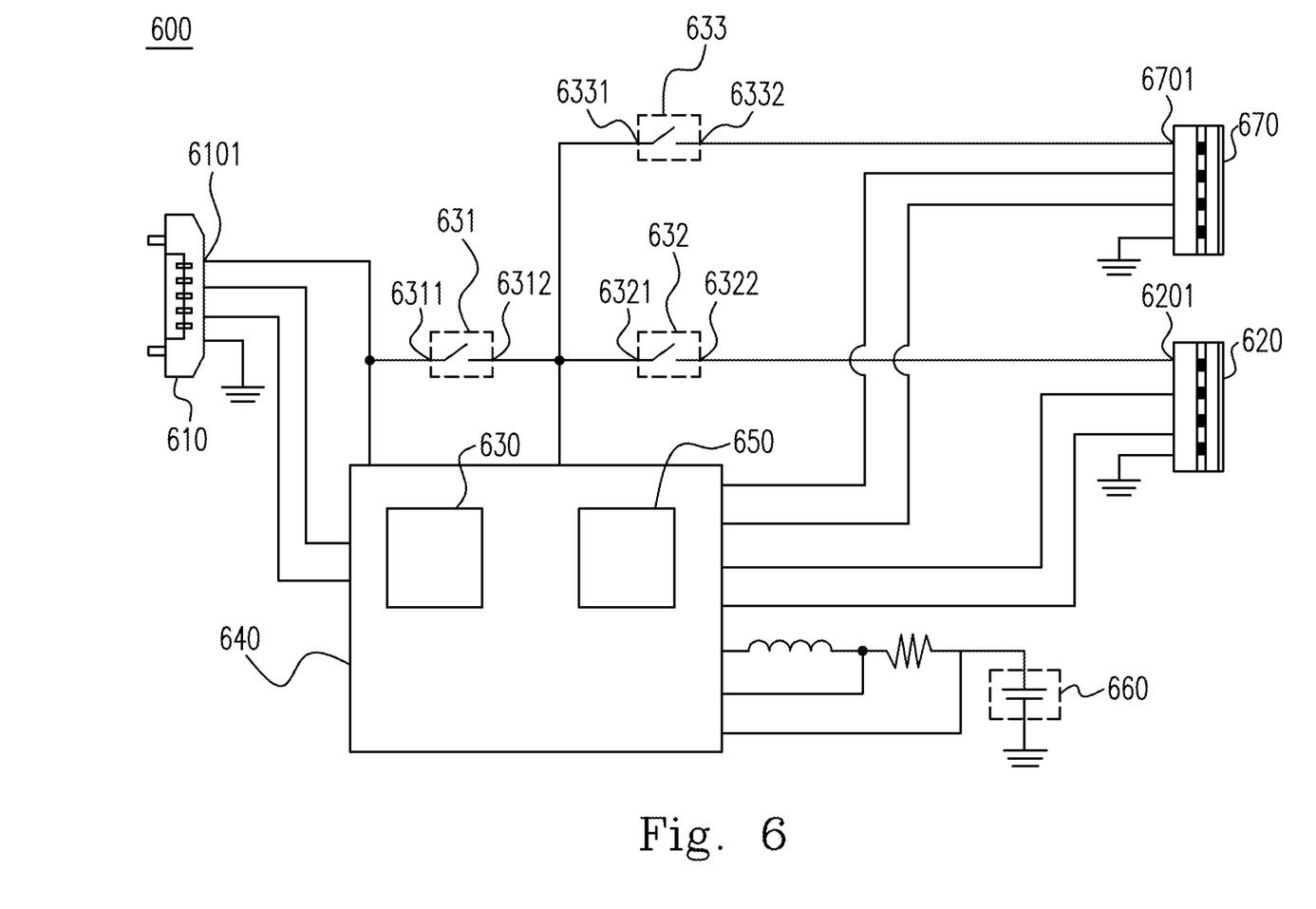
FIG. 6 is a schematic diagram of a mobile charge/discharge device according to a fifth preferred embodiment of the present invention.

Please refer to FIG. 6, which is a schematic diagram of a mobile charge/discharge device 600 according to a fifth preferred embodiment of the present invention. The circuit configuration in FIG. 6 is similar to that in FIG. 3. The difference is that the bypass circuit in FIG. 6 is employed by configuring a first switch 631 in series with a second switch 632 and a third switch 633. The first switch 631 has a first end 6311 which is electrically connected to a first power supply pin 6101, and a second end 6312 which is electrically connected to the charge/discharge module 640, a third end 6321 of the second switch 632 and a fifth end 6331 of the third switch 633. The second switch 632 has a fourth end 6322 which is electrically connected to a second power supply end 6201 of an output port 620. The third switch 633 has a sixth end 6332 which is electrically connected to a third power supply end 6701 of the output port 620. When the detection circuit 650 detects that the input port 610 is electrically connected to the adaptor (not shown) and two output ports are electrically connected to the mobile devices (not shown), a controlling circuit 630 controls the first switch, the second switch and the third switch to be in the ON-STATE, so that the mobile devices are directly powered by the power supplied by the adaptor. When the detection circuit 650 detects that the adaptor is removed from the input port 610, the controlling circuit 630 controls the first switch 531 to be in the OFF-STATE and the second switch and the third switch to in the be ON-STATE, so that the mobile devices are powered by a power storage 660 of the mobile charge/discharge device 600. The charge/discharge mechanism for the charge/discharge module 640 is the same as that for the second to fourth preferred embodiments, all of which can provide the fast charge effect.

Figure 7:
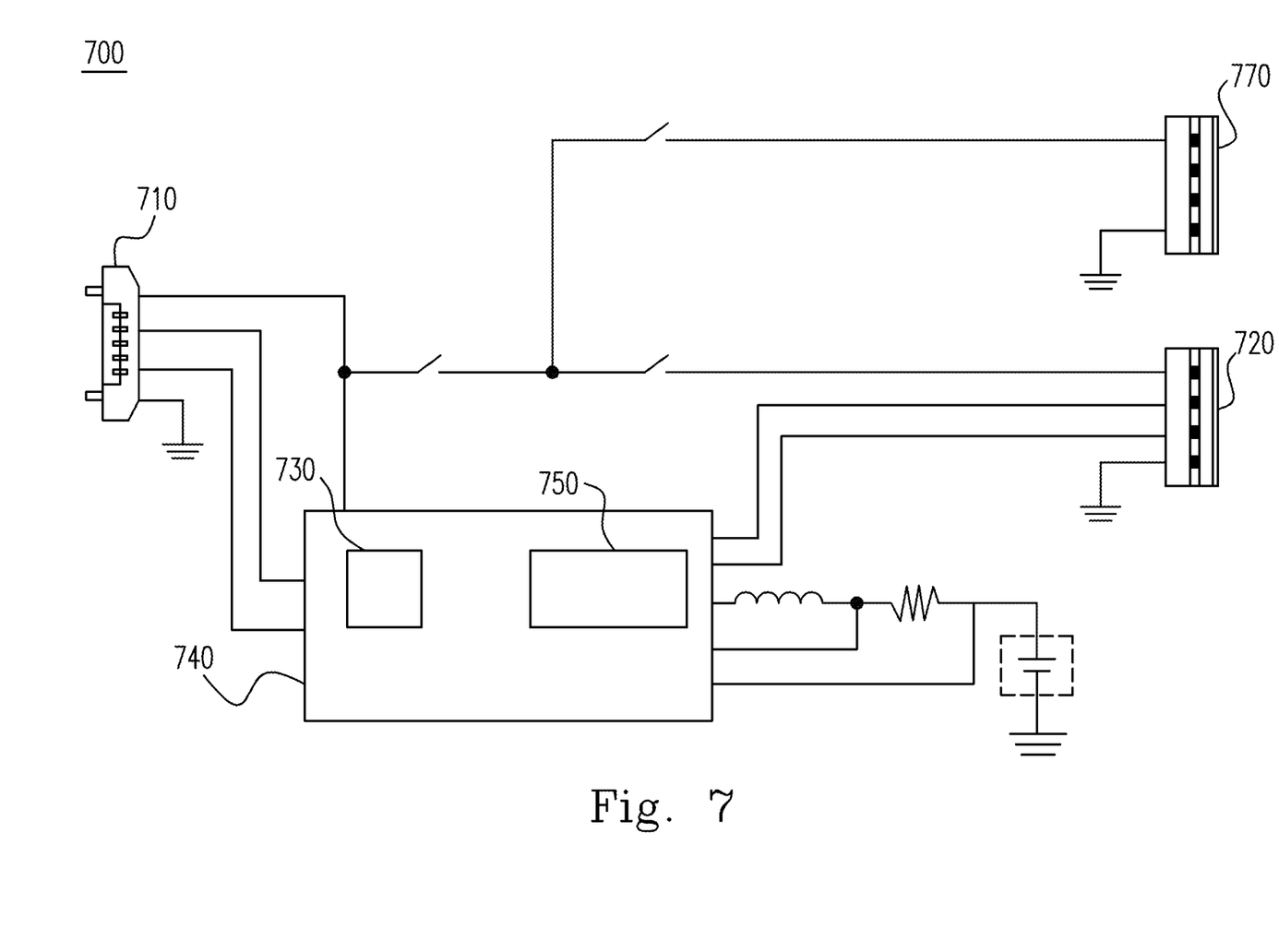
FIG. 7 is a schematic diagram of a mobile charge/discharge device according to a sixth preferred embodiment of the present invention.

Please refer to FIG. 7, which is a mobile charge/discharge device 700 according to a sixth preferred embodiment of the present invention. The circuit configuration in FIG. 7 is similar to that in FIG. 6. The difference is that the second output 670 in FIG. 6 is replaced with a second output 770 which is a conventional USB interface (i.e. a voltage of 5 V can only be output, and the fast charge is not supported), and the second output 770 is applied to the device where the fast charge is supported. When the input port 710 is electrically connected to the adaptor (not shown) and both the first output port and the second output port are electrically connected to the mobile device (not shown), the controlling circuit 730 controls the adaptor to only output a voltage of 5 V to the first output port and the second output port to prevent the device from being damaged. When the power source of the adaptor is removed and a detection circuit 750 once again detects the condition that both the first output port 720 and the second output port 770 are connected to the mobile devices, the first output port 720 and the second output port 770 remain at an output voltage of 5 V. The charge/discharge mechanism for the charge/discharge module 740 is the same as that for the second to fourth preferred embodiments, and all of which can provide the fast charge effect.

EMBODIMENTS

1. A mobile charge/discharge device for being electrically connected to a power source and a first power receiving device, including: a detection circuit detecting a first working power of the power source and a second working power of the first power receiving device; an input port having a first power supply pin for being electrically connected to the power source; a first output port having a second power supply pin for being electrically connected to the first power receiving device; and a controlling circuit controlling the power source to supply the first power receiving device with a power according to one of the first working power and the second working power and supply the mobile charge/discharge device with a power according to the difference of the first working power and the second working power at the same time.

2. The mobile charge/discharge device of Embodiment 1, wherein the controlling circuit controls the power source to supply the first power receiving device with a power according to the first working power when the first working power is smaller than the second working power.

3. The mobile charge/discharge device of any one of Embodiments 1-2, wherein the power source is an adaptor electrically connected to a commercial power.

4. The mobile charge/discharge device of any one of Embodiments 1-3 further including a power storage and a charge/discharge module electrically connected to the power storage and including the detecting circuit and the controlling circuit.

5. The mobile charge/discharge device of any one of Embodiments 1-4 further including a first switch having a first end electrically connected to the first power supply pin and the charge/discharge module, and a second end electrically connected to the second power supply pin.

6. The mobile charge/discharge device of any one of Embodiments 1-5 further including a second switch having a third end electrically connected to the charge/discharge module and a fourth end electrically connected to the second power supply pin.

7. The mobile charge/discharge device of any one of Embodiments 1-6 further including a second output port having a third power supply pin for being electrically connected to a second power receiving device.

8. The mobile charge/discharge device of any one of Embodiments 1-7 further including a third switch having a fifth end electrically connected to the first power supply pin and the charge/discharge module, and a sixth end electrically connected to the third power supply pin.

9. The mobile charge/discharge device of any one of Embodiments 1-8 further including a fourth switch having a seventh end electrically connected to the charge/discharge module and an eighth end electrically connected to the third power supply pin, wherein the detecting circuit detects a first working voltage of the first power receiving device and a second working voltage of the second power receiving device, and the controlling circuit controls the power source to supply the first power receiving device and the second power receiving device with a voltage according to the smaller one of the first working voltage and the second working voltage.

10. A power transmitting device, including: a power storage for storing a power from an adaptor supplied by a power source; a detecting circuit detecting a highest working voltage supplied through the adaptor; and a controlling circuit controlling the power to be stored in the power storage with a voltage according to the highest working voltage in the power storage.

11. The power transmitting device of Embodiment 10, further including a charge/discharge module, wherein and the detecting circuit detects a highest charging voltage of a power receiving device and the controlling circuit controls the charge/discharge module to charge the power receiving device with a voltage according to the highest charging voltage.

12. A mobile charge/discharge device for being electrically connected to a power source and a power receiving device, including: a detecting circuit detecting a first working power of the power source and a second working power of the power receiving device; and a controlling circuit controlling the power source to supply the power receiving device with a power according to the second working power and the mobile charge-discharge device with a power according to the difference of the first working power and the second working power.

13. The mobile charge/discharge device of Embodiment 12, wherein the detecting circuit has a first detecting sub-circuit detecting the first working power of the power source and a second detecting sub-circuit detecting the second working power of the power receiving device.

14. The mobile charge/discharge device of any one of Embodiments 12-13, wherein the power source comes from an adaptor electrically connected to a commercial power.

15. The mobile charge/discharge device of any one of Embodiments 12-14, wherein the first working power is a highest working power of the adaptor.

16. The mobile charge/discharge device of any one of Embodiments 12-15, further including a power storage and a charge/discharge module electrically connected to the power storage.

17. The mobile charge/discharge device of any one of Embodiments 12-16, further including a first power supply pin, a second power supply pin and a first switch having a first end electrically connected to the first power supply pin and the charge/discharge module, and a second end electrically connected to the second power supply pin.

18. The mobile charge/discharge device of any one of Embodiments 12-17, further including a second switch having a third end electrically connected to the charge/discharge module and a fourth end electrically connected to the second power supply pin.

19. The mobile charge/discharge device of any one of Embodiments 12-18, further including a third switch having a fifth end electrically connected to the first power supply pin and the charge/discharge module, and a sixth end electrically connected to a third power supply pin.

20. The mobile charge/discharge device of any one of Embodiments 12-19, further including a fourth switch having a seventh end electrically connected to the charge/discharge module and an eighth end electrically connected to the third power supply pin.

To sum up, the invention provides a mobile charge/discharge device which uses a bypass circuit to provide the mobile device and the internal lithium battery of the mobile charge/discharge device with the power provided by the adaptor at the same time, and detects the working voltage of the connected adaptor and mobile device to optimally allocate the power provided by the adaptor. When the device is connected to/removed from the input/output port, the working voltage between the mobile device and the adaptor will be detected again to offer the best and the fastest charge status for every mobile device, and thus the fast charge efficacy and the circuit protection are achieved. Therefore, the smart power management can be performed by the mobile charge/discharge device of the invention. In addition, a single charge/discharge IC having the fast charge function is used in the invention to reduce the number of the ICs and the passive elements, the area of the circuit in the circuit board, the cost of the elements, and the cost of the circuit configuration, increase the capacity of the lithium battery, extend the life span of the lithium battery, and prevent the circuit from overheating. Therefore, the mobile charge/discharge device of the invention is applicable to adaptors of providing any voltage and mobile devices of receiving any voltage, and the best integration effect without replacing the existing connecting ports and wires.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A mobile charge/discharge device for being electrically connected to a power source and a first power receiving device, comprising:
    a detecting circuit detecting a first working power of the power source and a second working power of the first power receiving device;
    an input port having a first power supply pin for being electrically connected to the power source;
    a first output port having a second power supply pin for being electrically connected to the first power receiving device; and
    a controlling circuit controlling the power source to supply the first power receiving device with a power according to the second working power and supply the mobile charge/discharge device with a power according to the difference of the first working power and the second working power, wherein the first working power is larger than the second working power,
    wherein the controlling circuit controls the power source to supply the first power receiving device with a power according to the first working power when the first working power is smaller than the second working power.

2. The mobile charge/discharge device according to claim 1, wherein the power source is an adaptor electrically connected to a commercial power.

3. The mobile charge/discharge device according to claim 2, further comprising a power storage and a charge/discharge module electrically connected to the power storage and including the detecting circuit and the controlling circuit.

4. The mobile charge/discharge device according to claim 3, further comprising a first switch having a first end electrically connected to the first power supply pin and the charge/discharge module, and a second end electrically connected to the second power supply pin.

5. The mobile charge/discharge device according to claim 4, further comprising a second switch having a third end electrically connected to the charge/discharge module and a fourth end electrically connected to the second power supply pin.

6. A mobile charge/discharge device for being electrically connected to a power source and a first power receiving device, comprising:
- a detecting circuit detecting a first working power of the power source and a second working power of the first power receiving device;
- an input port having a first power supply pin for being electrically connected to the power source;
- a first output port having a second power supply pin for being electrically connected to the first power receiving device;
- a controlling circuit controlling the power source to supply the first power receiving device with a power according to the second working power and supply the mobile charge/discharge device with a power according to the difference of the first working power and the second working power, wherein the first working power is larger than the second working power; and
- a second output port having a third power supply pin for being electrically connected to a second power receiving device, wherein the power source is an adaptor electrically connected to a commercial power.

7. The mobile charge/discharge device according to claim 6, further comprising a third switch having a fifth end electrically connected to the first power supply pin and the charge/discharge module, and a sixth end electrically connected to the third power supply pin.

8. The mobile charge/discharge device according to claim 7, further comprising a fourth switch having a seventh end electrically connected to the charge/discharge module and an eighth end electrically connected to the third power supply pin, wherein the detecting circuit detects a first working voltage of the first power receiving device and a second working voltage of the second power receiving device, and the controlling circuit controls the power source to supply the first power receiving device and the second power receiving device with a voltage according to the smaller one of the first working voltage and the second working voltage.

* * * * *